(12) United States Patent
Lee et al.

(10) Patent No.: US 12,090,869 B2
(45) Date of Patent: Sep. 17, 2024

(54) CHARGING SYSTEM

(71) Applicant: LG ELECTRONICS INC., Seoul (KR)

(72) Inventors: Jiho Lee, Seoul (KR); Hoon Hur, Seoul (KR); Hwankuk Yuh, Seoul (KR); Kangsuk Lee, Seoul (KR); Jungyoun Rue, Seoul (KR); Heemin Yun, Seoul (KR); Byungsoo An, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/577,931

(22) PCT Filed: Nov. 1, 2022

(86) PCT No.: PCT/KR2022/016949
§ 371 (c)(1),
(2) Date: Jan. 9, 2024

(87) PCT Pub. No.: WO2024/096153
PCT Pub. Date: May 10, 2024

(65) Prior Publication Data
US 2024/0262220 A1 Aug. 8, 2024

(51) Int. Cl.
*B60L 53/14* (2019.01)
*B60L 53/30* (2019.01)

(52) U.S. Cl.
CPC .............. *B60L 53/14* (2019.02); *B60L 53/305* (2019.02); *B60Y 2200/91* (2013.01)

(58) Field of Classification Search
CPC ..... B60L 53/14; B60L 53/305; B60Y 2200/91
(Continued)

(56) References Cited

U.S. PATENT DOCUMENTS 10,279,696 B2   5/2019   Dow et al.
10,723,237 B2 *  7/2020   Wechsler .............. B60L 53/122
(Continued)

FOREIGN PATENT DOCUMENTS

JP   2011-526858   10/2011
JP   2014-150642   8/2014
(Continued)

OTHER PUBLICATIONS

PCT International Application No. PCT/KR2022/016949, International Search Report dated Jul. 27, 2023, 6 pages.
(Continued)

*Primary Examiner* — Nathaniel R Pelton
(74) *Attorney, Agent, or Firm* — LEE, HONG, DEGERMAN, KANG & WAIMEY

(57) ABSTRACT

A charging system is a charging system comprising a charger for charging an electric vehicle, in which the charger comprises: a base; a charger provided with a contact-type charging terminal that is in contact with or separated from a charging terminal disposed on a lower surface of the electric vehicle; a main cylinder connected to the base and supplying hydraulic pressure; a hydraulic regulator connected to the main cylinder and provided with an inner flow path formed therein; a first hydraulic cylinder respectively connected to the hydraulic regulator and the charger and communicating with the inner flow path; and a second hydraulic cylinder each connected to the hydraulic regulator and the base and communicating with an inner flow path.

16 Claims, 9 Drawing Sheets

(58) Field of Classification Search
USPC .......................................................... 320/109
See application file for complete search history.

(56) References Cited

U.S. PATENT DOCUMENTS

| | | |
|---|---|---|
| 2012/0280649 A1 | 11/2012 | Jung |
| 2013/0012044 A1 | 1/2013 | Maurer et al. |
| 2018/0222338 A1 | 8/2018 | Sponheimer et al. |
| 2018/0281611 A1 | 10/2018 | Sebestyen |
| 2021/0086639 A1* | 3/2021 | Rakuff .................... B60L 53/31 |
| 2022/0032800 A1 | 2/2022 | Naganishi et al. |

FOREIGN PATENT DOCUMENTS

| | | |
|---|---|---|
| JP | 2022-026379 | 2/2022 |
| KR | 1998-056758 | 9/1998 |
| KR | 10-2010-0126120 | 12/2010 |
| KR | 1020120011130 | 2/2012 |
| KR | 1020120124825 | 11/2012 |
| KR | 1020180059534 | 6/2018 |

OTHER PUBLICATIONS

Korean Intellectual Property Office Application No. 10-2023-7042346, Notice of Allowance dated Apr. 29, 2024, 2 pages.

* cited by examiner

[FIG. 1]
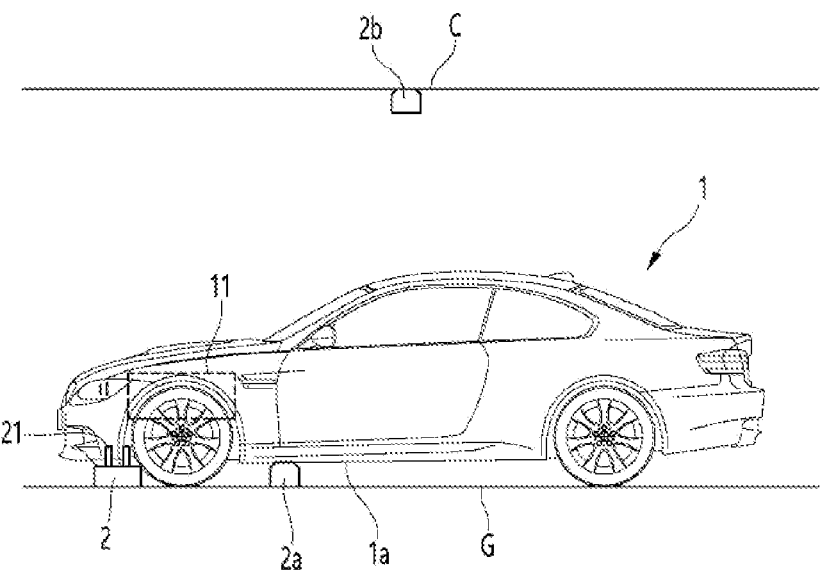
[FIG. 2]
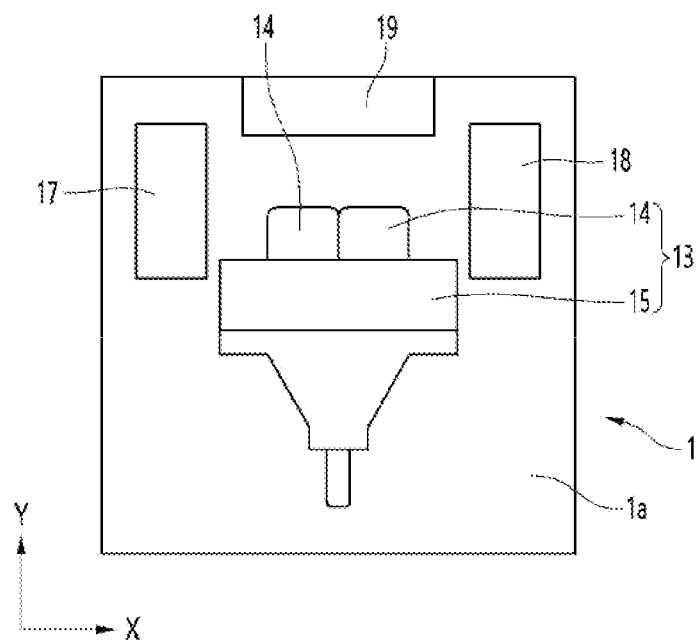

[FIG. 3]
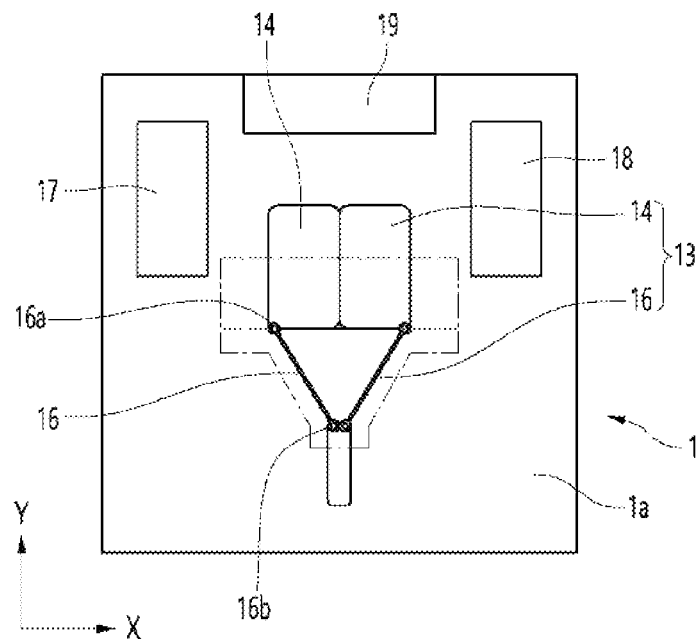
[FIG. 4]
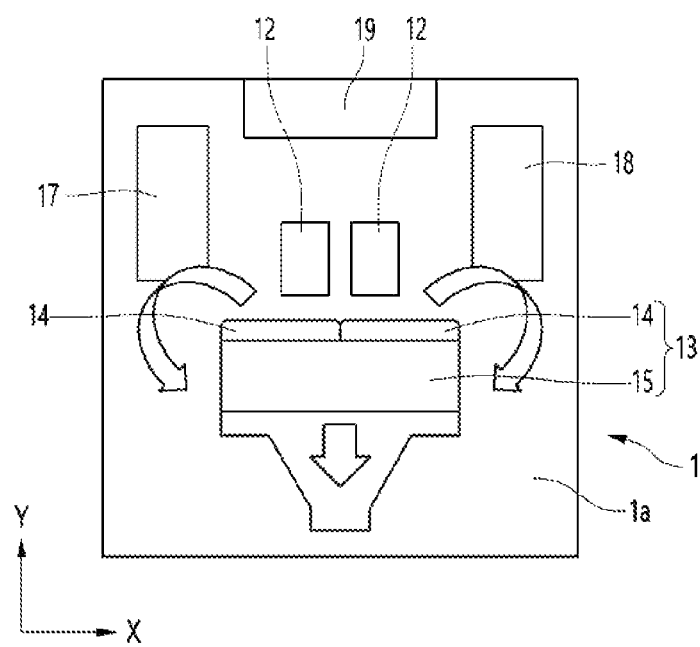

[FIG. 5]
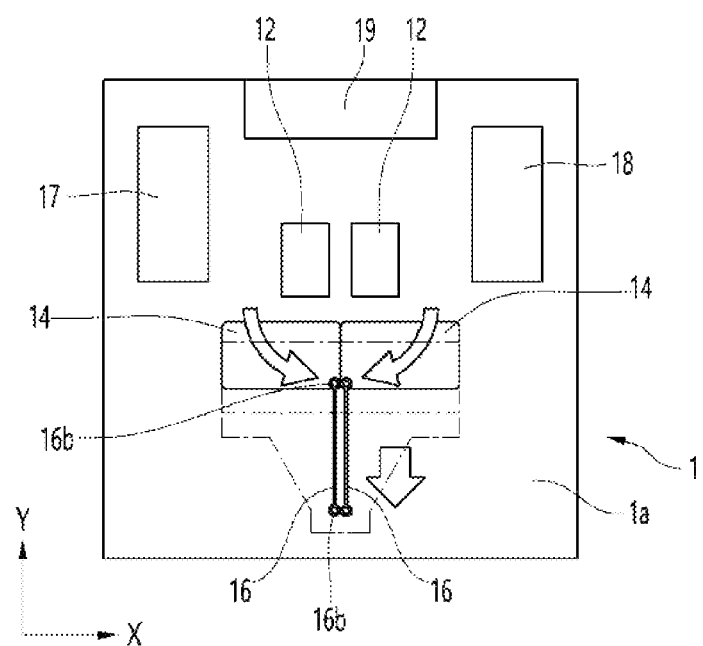

[FIG. 6]
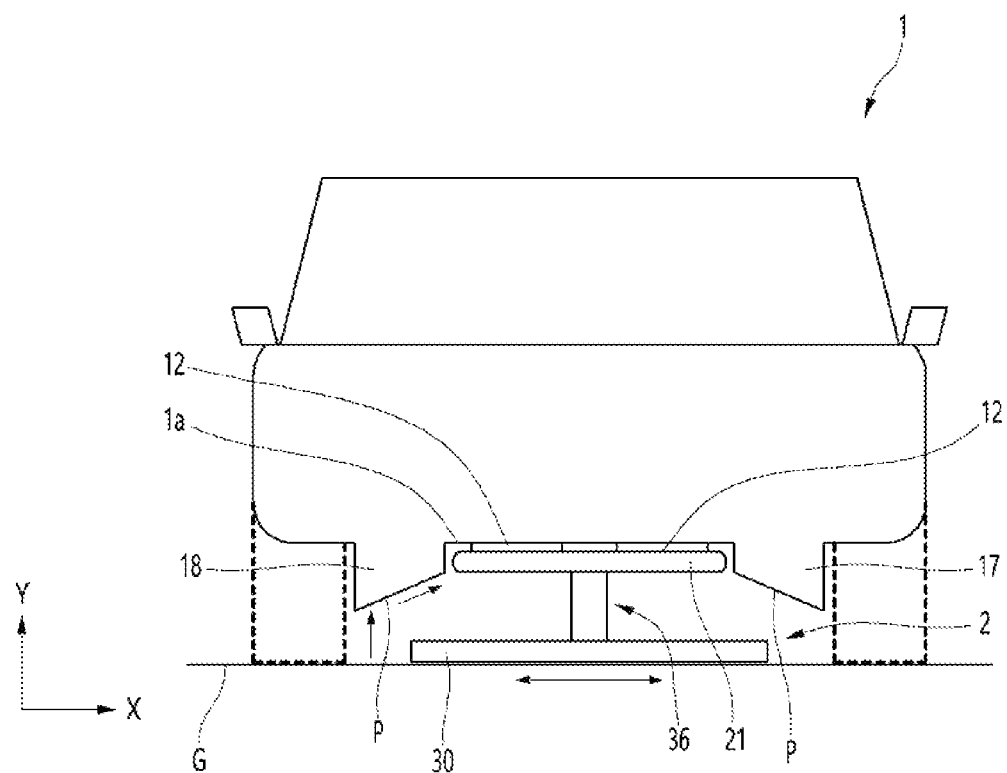

[FIG. 7]
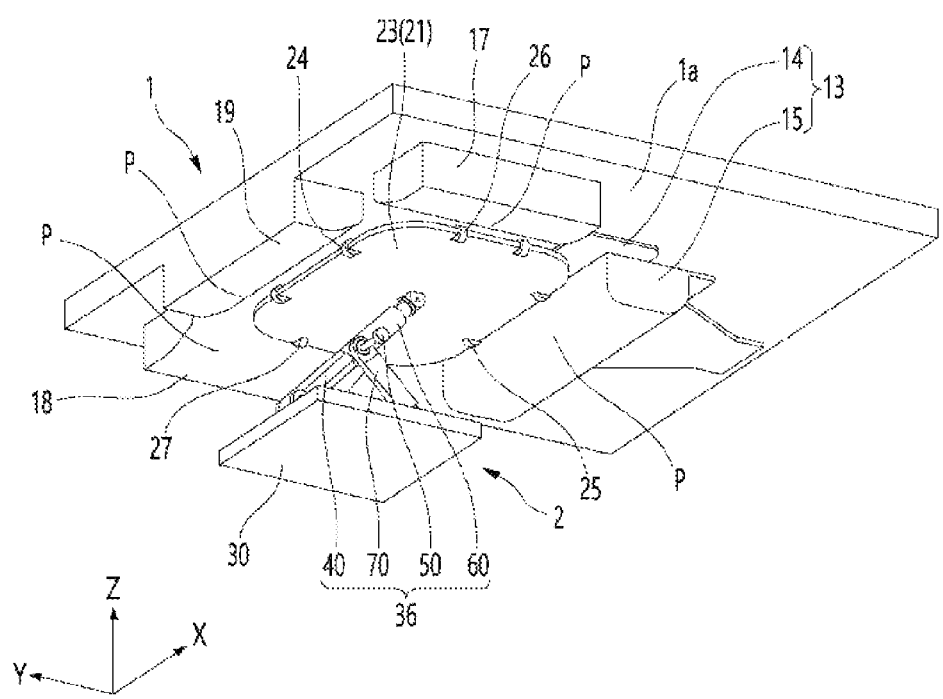

[FIG. 8]
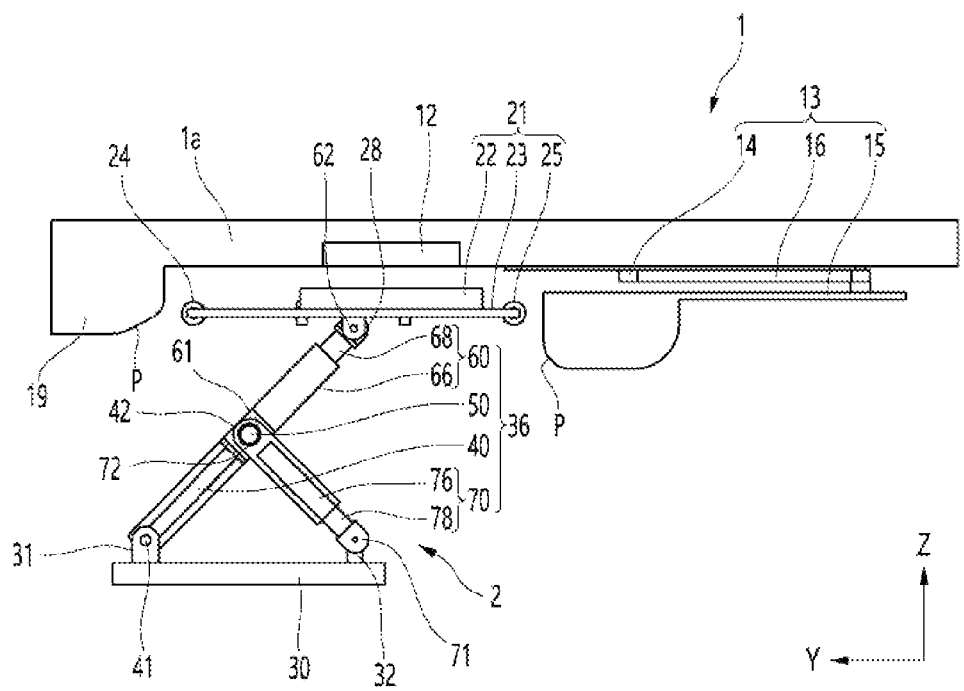
[FIG. 9]
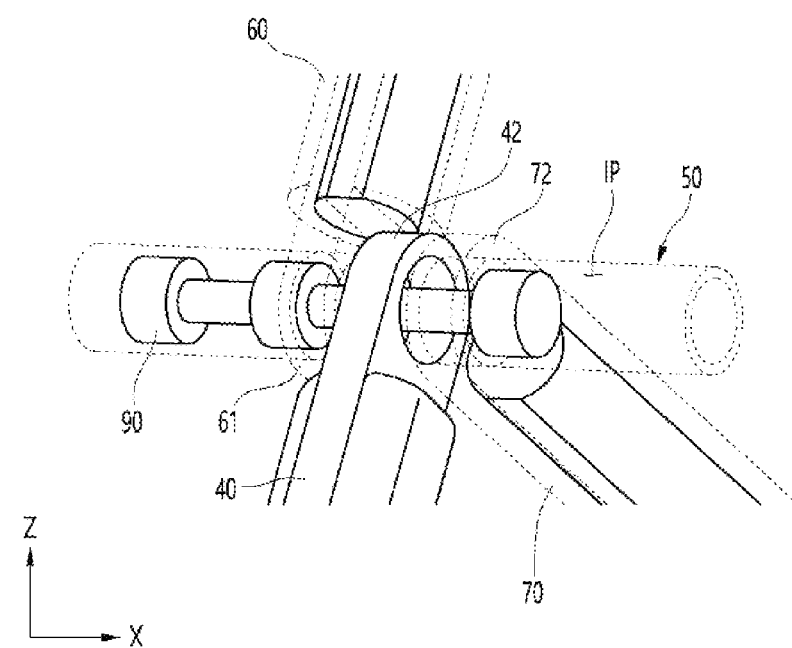

[FIG. 12]
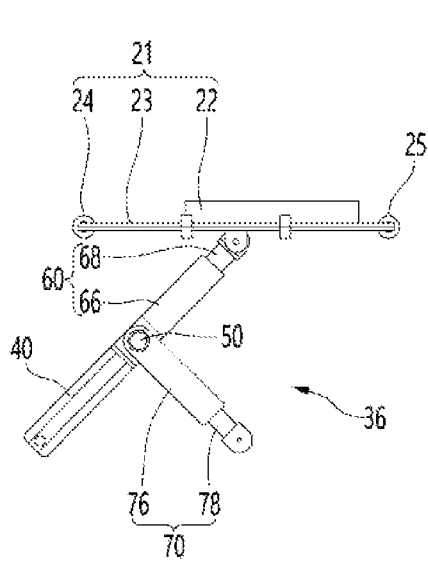
(a)
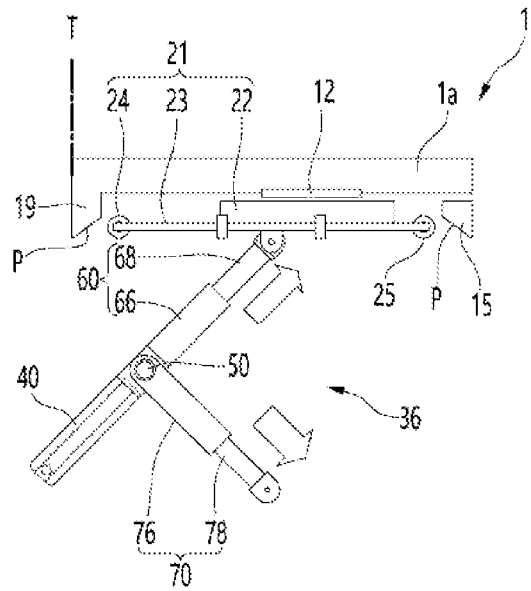
(b)
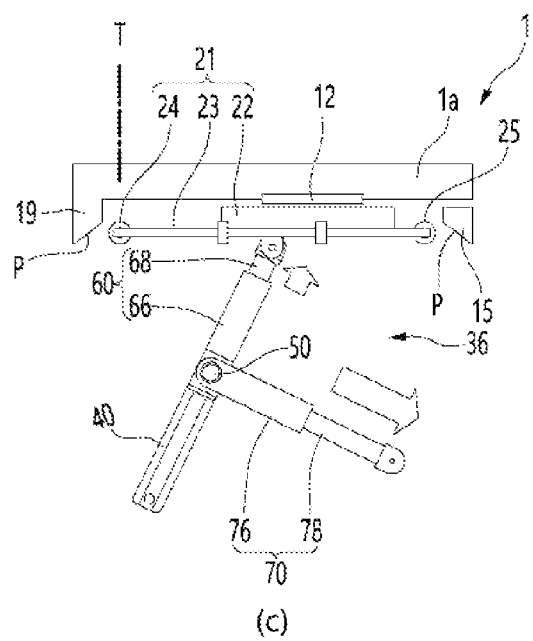
(c)
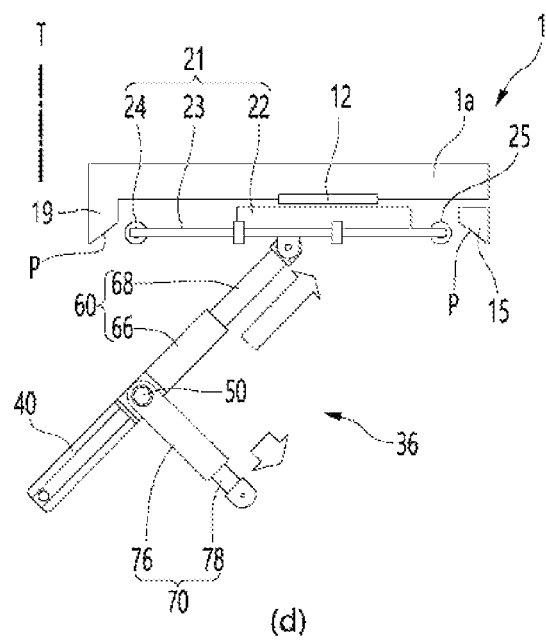
(d)

CHARGING SYSTEM

CROSS-REFERENCE TO RELATED APPLICATION(S)

This application is the National Stage filing under 35 U.S.C. 371 of International Application No. PCT/KR2022/016949, filed on Nov. 1, 2022, the contents of which is hereby incorporated by reference herein in its entirety.

TECHNICAL FIELD

The present disclosure relates to a charging system.

BACKGROUND ART

The charging station can charge the battery of an electric vehicle.

An example of a charging station is the charging station disclosed in Japanese Patent Publication No. 2011-526858 (published on Oct. 20, 2011), and the charging station comprises a charging chassis that is formed of spaced guide strips, each of which has a conductive surface for contacting the electrode, is mechanically connected to the charging mount and comprises a current collector brace at the lower portion extending away from the charging mount, wherein a guide strip provides the position and orientation of the one current collector brace, a pillar that is a mechanically connected to the charging mount, and a stand mechanically connected to the pillar to support the pillar and the charging mount.

However, the charging station disclosed in Japanese Patent Publication No. 2011-526858 (published on Oct. 20, 2011) has a problem that it has a high charging chassis height and thus safety of the charging chassis is low and service thereof is inconvenient when the charging chassis breaks down.

As another example of a charging station, an automatic charging station for electric vehicles is disclosed in U.S. Pat. No. 10,279,696 B2 (published on May 7, 2019), and the automatic charging station comprises a parking lane, and the parking lane comprises an alignment mechanism that ensures the alignment of the electric vehicle into the parking lane, a sensor that detects the electric vehicle when the electric vehicles enters the parking lane, an arm pivotably mounted in the parking lane, and a charging coupler that is located on the arm and moves by vertical arc pivoting to contact a receptacle attached to the bottom of the electric vehicle.

DISCLOSURE

Technical Problem

An object of the present embodiment is to provide a charging system in which a charger can reliably contact the charging terminal of an electric vehicle.

Technical Solution

A charging system according to the present embodiment is a charging system comprising a charger for charging an electric vehicle, in which the charger may comprise a base; a charger provided with a contact-type charging terminal that is in contact with or separated from a charging terminal disposed on a lower surface of the electric vehicle; a main cylinder connected to the base and supplying hydraulic pressure; a hydraulic regulator connected to the main cylinder and provided with an inner flow path formed therein; a first cylinder respectively connected to the hydraulic regulator and the charger and communicating with the inner flow path; and a second cylinder each connected to the hydraulic regulator and the base and communicating with an inner flow path.

The base may be slidably disposed on a bottom of a charging station.

The charger may further comprise a moving body on which the contact-type charging terminal is disposed, and in which a first cylinder connection portion to which the first cylinder is connected may be formed on the moving body.

The charger may further comprise at least one roller disposed on an outer circumference of the moving body.

The hydraulic regulator may comprise an inner body in which the inner flow path is formed; a valve rod disposed to move along the inner flow path in a longitudinal direction of the inner body; and a coil disposed on the inner body and moving the valve rod.

The hydraulic regulator may further comprise an outer body disposed around the outer circumference of the inner body and covering the coil.

The hydraulic regulator may further comprise a spring disposed on the inner body and elastically supporting the valve rod.

The hydraulic regulator may comprise a main supply hole through which the main cylinder communicates; a first supply hole spaced apart from the main supply hole and communicating with the first cylinder, and a second supply hole which is spaced apart from the main supply hole and the first supply hole and communicates with the second cylinder.

The valve rod may comprise a rod portion long in a longitudinal direction of the inner body; a first valve portion which protrudes from the rod portion and opens and closes the first supply hole; and a second valve portion which protrudes from the rod portion and opens and closes the second supply hole. The second valve portion may be spaced apart from the first valve portion.

The valve rod may further comprise a protrusion protruding from the rod portion. When current is supplied to the coil, the space between the second valve portion and the protrusion may communicate with each of the main supply hole, the first supply hole, and the second supply hole.

After current is supplied to the coil, the main cylinder may supply hydraulic pressure to the inner flow path.

A guide may be disposed on the lower surface of the electric vehicle to guide the movement of the charger in a horizontal direction.

A chamfer may be inclinedly formed in the guide to guide the charger.

The electric vehicle may further comprise a cover that opens and closes the charging terminal.

The cover may comprise an opening/closing cover rotated below the charging terminal; a slide cover disposed to slide on the lower surface of the body of the electric vehicle; and connection links connected to the opening/closing cover and the slide cover, respectively.

The electric vehicle may further comprise a slide drive source that slides the slide cover forward and backward.

Advantageous Effect

According to the present embodiment, the charger can move in the vertical and horizontal directions according to the stopping position of the electric vehicle and be in contact with the charging terminal, so that the electric vehicle can be reliably charged.

In addition, since the charger is automatically aligned and in contact with the charging terminal, charging efficiency is high and charging can be performed more easily.

DESCRIPTION OF DRAWINGS

FIG. 1 is a view illustrating a charging station of a charging system according to the present embodiment;

FIG. 2 is a bottom view when the charging terminal of the electric vehicle according to the present embodiment is covered by a cover;

FIG. 3 is a bottom view illustrating the inside of the cover illustrated in FIG. 2;

FIG. 4 is a bottom view when the charging terminal of the electric vehicle according to the present embodiment is exposed;

FIG. 5 is a bottom view illustrating the inside of the cover illustrated in FIG. 4;

FIG. 6 is a front view illustrating a charging system according to the present embodiment;

FIG. 7 is a perspective view illustrating the charging system according to the present embodiment;

FIG. 8 is an enlarged side view illustrating the cover and charger according to the present embodiment;

FIG. 9 is a view illustrating a hydraulic regulator according to the present embodiment;

FIG. 11 is a cross-sectional view illustrating the inner flow path when the hydraulic regulator according to the present embodiment is turned on;

FIG. 12 is a view illustrating an example in which the charger position of the charging system according to the present embodiment is variable.

BEST MODE

Figure 10:
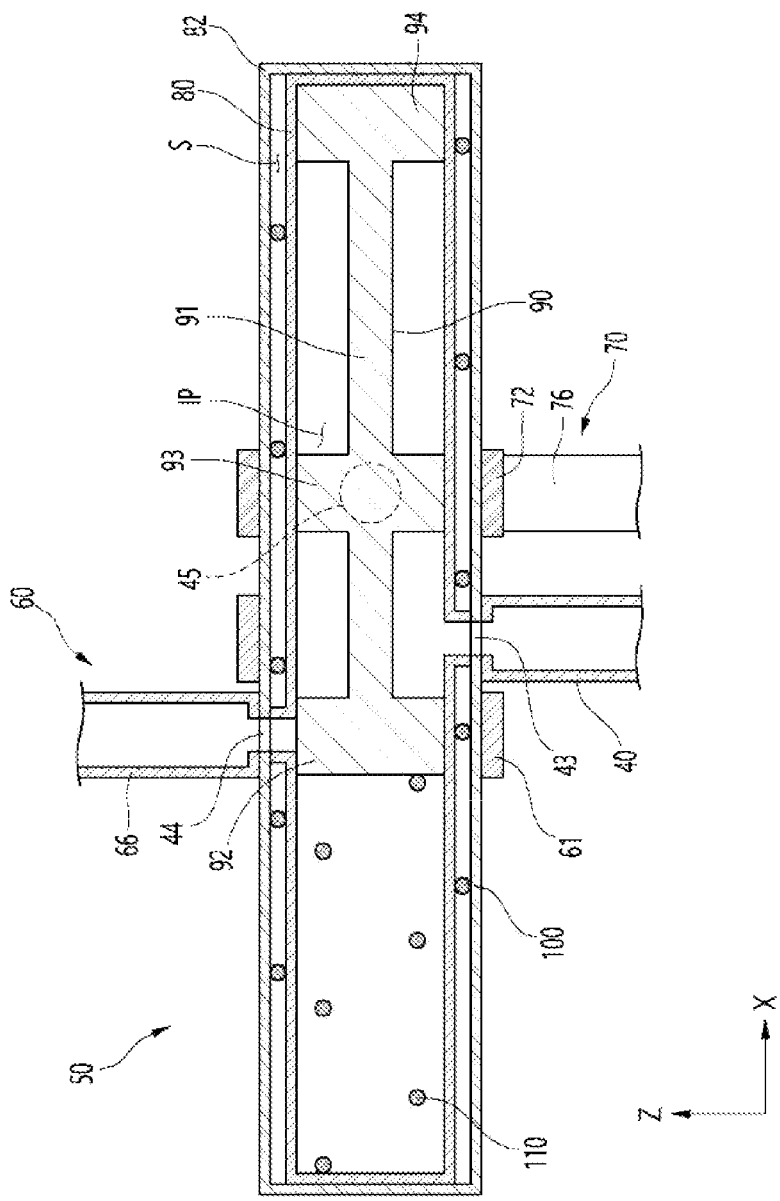
FIG. 10 is a cross-sectional view illustrating the inner flow path when the hydraulic regulator according to the present embodiment is turned off.

Hereinafter, specific embodiments of the present disclosure will be described in detail along with the drawings.

FIG. 1 is a view illustrating a charging station of a charging system according to the present embodiment.

The charging system may comprise a charger 2 that charges the electric vehicle 1.

A battery 11 may be placed inside the electric vehicle 1, and a charging terminal 12 (see FIGS. 4 and 5) may be placed on the lower surface of the electric vehicle 1. The charging terminal 12 may be placed on the lower surface of the body 1a of the electric vehicle 1. The charging terminal 12 can be electrically connected to the battery 11, and when the charger 2 is connected to the charging terminal 12, the battery 11 can be charged.

The charger 2 may be placed on the bottom G of a charging station (that is, a charging station) that charges the electric vehicle 1. The charger 2 may comprise a charger 21 that can be in contact with or separated from the charging terminal 12.

A sensor capable of sensing the electric vehicle 1 may be disposed at a charging station where the electric vehicle 1 is charged. Examples of sensors are not limited to types such as optical sensors, photo sensors, motion sensors, pressure sensors, and laser sensors, as long as they are configured to sense the presence or absence of the electric vehicle 1 or the position of the electric vehicle 1.

An example of the sensor may comprise a bottom sensor 2a installed on the bottom G of the charging station and a ceiling sensor 2b installed on the ceiling C of the charging station.

FIG. 2 is a bottom view when the charging terminal of the electric vehicle according to the present embodiment is covered by a cover, FIG. 3 is a bottom view illustrating the inside of the cover illustrated in FIG. 2, FIG. 4 is a bottom view when the charging terminal of the electric vehicle according to the present embodiment is exposed, and FIG. 5 is a bottom view illustrating the inside of the cover illustrated in FIG. 4

At least one charging terminal 12 may be disposed on the bottom (that is, lower surface) of the electric vehicle 1. A plurality of charging terminals 12 may be provided on the body 1a of the electric vehicle 1, and a plurality of charging terminals 12 may be placed on the body 1a of the electric vehicle 1 to be spaced apart from each other in the left and right direction X or in the front and rear direction.

The electric vehicle 1 may comprise a cover 13 that can cover the charging terminal 12. The cover 13 can open and close the charging terminal 12.

The cover 13 may be a cover assembly composed of a combination of a plurality of members.

The cover 13 may comprise an opening/closing cover 14. The opening/closing cover 14 may be rotated to the lower side of the charging terminal 12. The opening/closing cover 14 can be rotated to a closed position, as illustrated in FIG. 2, or to an open position, as illustrated in FIG. 4.

The closed position is a position below the charging terminal 12, and as illustrated in FIG. 2, it may be a position where the opening/closing cover 14 overlaps the charging terminal 12 in the vertical direction.

The open position is a position around the lower side of the charging terminal 12, and as illustrated in FIG. 4, the open position may be a position where the opening/closing cover 14 does not overlap the charging terminal 12 in the vertical direction.

The cover 13 may further comprise a slide cover 15.

The slide cover 15 may be placed on the lower surface of the body 1a of the electric vehicle 1 to slide in the left and right direction X or the front and rear direction Y.

The slide cover 15 may be disposed to hang on the body 1a of the electric vehicle 1 and may slide on the lower surface of the body 1a of the electric vehicle 1.

A sliding guide may be formed on the lower surface of the body 1a of the electric vehicle 1 to guide the sliding of the slide cover 15.

The electric vehicle 1 may further comprise a slide drive source (not illustrated) capable of sliding the slide cover 15.

The slide drive source may be mounted on the electric vehicle 1. An example of the slide drive source may comprise a linear motor, hydraulic cylinder, or pneumatic cylinder connected to the slide cover 15. Another example of the slide drive source may comprise a power transmission member consisting of a plurality of gears connected to the slide cover 15, and a motor that rotates the power transmission member.

The slide drive source may be operated according to a detected value from a sensor that senses the electric vehicle 1 or an input value from an input part such as a button provided to the electric vehicle by the driver of the electric vehicle 1.

The slide drive source can operate the cover 13 in an open mode before starting charging of the electric vehicle 1, and the cover 13 can be moved in an exposed position exposing the charging terminal 12, as illustrated in FIG. 4.

When charging of the electric vehicle 1 is completed, the slide drive source can operate the cover 13 in a closed mode, and the cover 13 can be moved from the lower side of the charging terminal 12 to a position covering a charging cover 12, as illustrated in FIG. 2.

The cover 13 may comprise a connecting link 16 (see FIGS. 3 and 5).

The connection link 16 may be connected to the opening/closing cover 14 and the slide cover 15, respectively. The connection link 16 can rotate the opening/closing cover 14 when the slide cover 15 slides.

The connection link 16 may comprise a link connection portion 16a connected to the opening/closing cover 14, a cover connection portion 16b connected to the slide cover 15, and a link part 16c connecting the link connection portion 16a and the cover connection portion 16b.

The link connection portion 16a may be connected to a location other than the center of the opening/closing cover 14. The link connection portion 16a may be connected to an area close to the outer circumference of the opening/closing cover 14.

The cover 13 may be connected to the opening/closing cover 14 and the slide cover 15 by a connecting link 16, and the opening/closing cover 14 can rotate in conjunction with the connecting link 16 when the slide cover 15 moves.

When there are a plurality of charging terminals 12, the opening/closing cover 14 may correspond to the charging terminal 12 in a 1:1 relationship, and the connection link 16 may correspond to the opening/closing cover 14 in a 1:1 relationship.

For example, when the charging terminal 12 comprises a left terminal and a right terminal, the cover may comprise a left opening/closing cover that opens and closes the left terminal, and a left link connected to a left opening/closing cover and the slide cover 15 and may comprise a right opening/closing cover that opens and closes the right terminal, and a right link connected to the right opening/closing cover and the slide cover 15.

The charging terminal 12 can be protected by the cover 13, and the cover 13 can waterproof the charging terminal 12 and protect the charging terminal 12 from external shock.

FIG. 6 is a front view illustrating a charging system according to the present embodiment, FIG. 7 is a perspective view illustrating the charging system according to the present embodiment, and FIG. 8 is an enlarged side view illustrating the cover and charger according to the present embodiment.

The charger 2 may be located below the electric vehicle 1 moved to the charging area of the charging station.

The charger 2 may comprise a charger 21 that can charge the electric vehicle 1.

The charger 21 may comprise a contact-type charging terminal 22 (see FIG. 8) that is in contact with the charging terminal 12. The contact-type charging terminal 22 may be raised from the lower side of the charging terminal 12 and be in contact with the charging terminal 12, and may be lowered and separated from the charging terminal 12 when charging of the electric vehicle 1 is completed. When the contact-type charging terminal 22 is separated from the charging terminal 12, it may not be in contact with the charging terminal 12.

An example of the contact-type charging terminal 22 may be a charging pad that can be in surface contact with the charging terminal 12 provided in the electric vehicle 1.

The charger 21 may comprise a moving body 23 that moves the contact-type charging terminal 22. The contact-type charging terminal 22 may be placed on the moving body 23, as illustrated in FIG. 8. The contact-type charging terminal 22 may be disposed on the upper surface of the moving body 23. The contact-type charging terminal 22 may be fixedly mounted on the upper surface of the moving body 23.

The moving body 23 may be spaced apart from the base 30, which will be described later, in the vertical direction Z, and may be parallel to the base 30. The moving body 23 may be formed in a substantially square or rectangular shape and may be formed with rounded apexes.

The contact-type charging terminal 22 may move together with the moving body 23 when the moving body 23 moves.

The charger 21 may comprise a roller rotatably disposed on the moving body 23. At least one roller may be disposed on the outer circumference of the moving body 23. As illustrated in FIGS. 7 and 8, a plurality of rollers may be disposed on the moving body 23. A plurality of rollers 24, 25, 26, and 27 may comprise the front roller 24 that is disposed at the front end of the moving body 23 and rotates about the center of rotation in the left and right direction, a rear roller 25 that is disposed at the rear end of the moving body 23 and rotates about the center of rotation in the left and right direction, a left roller 26 that is disposed at the left end of the moving body 23 and rotates about the center of rotation in the front and rear direction, and a right roller 27 that is disposed at the right end of the moving body 23 and rotates about the center of rotation in the front and rear direction.

At least one guide that guides the charger 21 may be disposed on the body 1a of the electric vehicle 1. A plurality of guides may be provided on the lower surface of the body 1a of the electric vehicle 1.

The guide may be provided to protrude downward from the lower surface of the body 1a of the electric vehicle 1.

The guide may guide the movement of the charger 21 in the horizontal direction X, Y.

The electric vehicle 1 may be stopped at the upper side of the charger 2, but the electric vehicle 1 may not be stopped at the correct position, and the charging terminal 12 installed on the electric vehicle 1 may not match the charger 21 in the vertical direction Z when the charger 21 is raised.

However, if a guide is formed in the electric vehicle 1 and the charger 21 is guided by the guide and moves in the horizontal direction, the horizontal position of the charger 21 can be adjusted to a position that matches the charging terminal 12 and the reliability of charging the electric vehicle 1 can be improved.

A plurality of guides may be provided on the lower surface of the body 1a of the electric vehicle 1. The plurality of guides 17, 18, 19 may comprise guides 17 and 18 in the left and right direction that guide the charger 21 in the left and right direction X and a guide 19 in the front and back direction that guide the charger 21 in the front and back direction Y.

The guides 17 and 18 in the left and right direction may comprise a left guide 17 and a right guide 18 spaced apart in the left and right direction X.

Each of the left guide 17 and the right guide 18 may be formed to be long in the front and rear direction Y and may be parallel to each other.

The left guide 17 and the right guide 18 may be spaced apart from each other by a distance larger than the width of the charger 21 in the left and right direction X.

The guide 19 in the left and right direction may be formed to be long in the left and right direction X.

As an example, a pair of the guides 19 in the front and rear direction may be provided, such as guides in the left and right direction, and the pair of guides 19 in the front and rear direction may be spaced apart from each other at a distance greater than the width of the charger 21 in the left and right direction X.

As another example, one guide 19 in the front and rear direction may be provided on the lower body of the body 1a of the electric vehicle 1.

When one guide 19 in the front and rear direction is provided on the lower surface of the body 1a of the electric vehicle 1, the cover 13 may further comprise a guide for guiding the charger 21.

The cover 13 has a guide 19 in the front and rear direction that can be spaced apart in the front and rear direction Y, and a portion of the cover 13, like the guide 19 in the front and rear direction, can guide the charger 21 in the front and rear direction Y.

A guide for guiding the charger 21 may be formed on the slide cover 15 of the cover 13.

The cover 13 may be spaced apart from the guide 19 in the front and rear direction in the front and rear direction Y, and one end of the front and rear ends of the charger 21 may be guided in the front and rear direction Y by the guide 19 in the front and rear direction, and the other end of the front and rear ends of the charger 21 may be guided by the slide cover 15 in the front and rear direction Y.

A guide chamfer P that guides the charger 21 may be formed on the guides 17, 18, and 19. The guide chamfer P may be formed to be inclined or convex on the guides 17, 18, and 19.

A guide chamfer P may be formed on the slide cover 15 to guide the charger 21, and the guide chamfer P may be formed on the slide cover 15 to be inclined or convex.

The guide chamfer P can guide the charger 21 to the lower side of the charging terminal 12.

The charger 2 may be configured so that the charger 21 can move in the left and right direction X and the front and rear direction Y according to the stopping position of the electric vehicle 1.

In this case, when the charger 21 is raised, the rollers 24, 25, 26, and 27 may be guided and rolled with the guide chamfer P of the guides 17, 18, and 19 or the chamfer P of the slide cover 15, and while the charger 21 is moved in the left and right direction X or in the front and rear direction Y, the charger 21 may be raised and thus be guided to the lower surface of the terminal 12.

Hereinafter, the charger 2 will be described.

The charger 2 may comprise a base 30 and a cylinder assembly 36 mounted on the base 30 to move the charger 21.

The base 30 may be disposed on the ground G (see FIG. 6) of the charging station and may support the cylinder assembly 36.

The base 30 may be slidably placed on the bottom of the charging station.

The base 30 may be a slide base or a moving base that slides in the left and right direction X or front and rear direction Y from the lower side of the electric vehicle 1.

An example of the base 30 may be disposed to slide in the left and right direction X on the ground G of the charging station. Another example of the base 30 may be disposed on the ground G of the charging station to slide in the front and rear direction Y.

In one example of a charging station, a recessed part (groove) may be formed in the ground G in which the base 30 is accommodated to slide in the left and right direction Y.

As another example of a charging station, a separate base holder (not illustrated) supporting the base 30 may be disposed on the ground G. In this case, the base 30 may be disposed on the base holder to slide in the left and right directions X.

Hereinafter, an example in which the base 30 slides in a recessed part in the ground G and another example in which the base 30 slides in a base holder will be described as the base 30 being slidably disposed on the bottom of the charging station.

The cylinder assembly 36 may be disposed on the upper side of the base 30.

The cylinder assembly 36 may be a hydraulic adjustment mechanism using hydraulic pressure or may be a pneumatic adjustment mechanism using pneumatic pressure.

The cylinder assembly 36 may comprise a main cylinder 40, a hydraulic regulator 50, a first cylinder 60, and a second cylinder 70, and can move the charger 21 using hydraulic pressure. Hereinafter, the cylinder assembly 36 will be described as a hydraulic adjustment mechanism, but of course it is not limited to hydraulic pressure.

The main cylinder 40 may be a hydraulic supply cylinder that supplies hydraulic pressure to the hydraulic regulator 50, and the hydraulic regulator 50 may transfer hydraulic pressure supplied from the main cylinder 40 to the first cylinder 60 and the second cylinder 70, and the first cylinder 60 and the second cylinder 70 can advance and retract the piston rod by hydraulic pressure supplied from the hydraulic regulator 50.

The main cylinder 40 may be connected to the base 30 and may supply hydraulic pressure.

The main cylinder 40 may be rotatably connected to each of the base 30 and the hydraulic regulator 50.

The main cylinder 40 may comprise a base connection portion 41 rotatably connected to the base 30. The base connection portion 41 may be rotatably supported on the main cylinder support part 31 (for example, a supporting bracket) formed on the base 30. The main cylinder 40 may be rotated to stand upward or lie down about the main cylinder support 31.

The main cylinder 40 may comprise a hydraulic regulator connection portion 42 rotatably connected to the hydraulic regulator 50.

A hydraulic regulator connection portion 42 may be provided opposite the base connection portion 41. The hydraulic regulator connection portion 42 may be formed in a ring shape surrounding the outer circumference of the hydraulic regulator 50.

The base connection portion 41 may be provided on the lower side of the main cylinder 40, and the hydraulic regulator connection portion 42 may be provided on the upper side of the main cylinder 40.

The hydraulic regulator 50 may be disposed on the upper side of the base 30 and spaced apart from the base 30.

The hydraulic regulator 50 may have a circular outer circumference.

The hydraulic regulator 50 may be connected to the main cylinder 40, and an inner flow path may be formed inside the hydraulic regulator 50.

The hydraulic regulator 50 may be connected to each of the main cylinder 40, the first cylinder 60, and the second cylinder 70 and distribute hydraulic pressure supplied from the main cylinder 40 to the first cylinder 60 and the second cylinder 70.

The hydraulic regulator 50 may be formed with an inner flow path communicating with each of the main cylinder 40, the first cylinder 60, and the second cylinder 70.

The first cylinder 60 may be connected to each of the charger 21 and the hydraulic regulator 50. The first cylinder 60 may be rotatably connected to each of the charger 21 and the hydraulic regulator 50. The first cylinder 60 may be in communication with the inner flow path of the hydraulic regulator 50.

The first cylinder 60 may be a cylinder that adjusts the height of the charger 21.

The first cylinder 60 may comprise a hydraulic regulator connection portion 61 rotatably connected to the hydraulic regulator 50.

The hydraulic regulator connection portion 61 may be formed in a ring shape surrounding the outer circumference of the hydraulic regulator 50.

The first cylinder 60 may comprise a charger connection portion 62 rotatably connected to the charger 21.

The charger connection portion 62 may be provided opposite the hydraulic regulator connection portion 61.

The hydraulic regulator connection portion 61 may be provided on the lower side of the first cylinder 60, and the charger connection portion 62 may be provided on the upper side of the first cylinder 60.

The charger connection portion 62 may be rotatably supported on the first cylinder connection portion 28 (for example, connecting bracket) formed on the charger 21. The first cylinder 60 may be rotated to stand upward or lie down about the hydraulic regulator 50.

The first cylinder 60 may comprise a cylinder body 66 and a piston rod 68 that operates according to hydraulic pressure inside the cylinder body 66.

The hydraulic regulator connection portion 61 of the first cylinder 60 may be formed on the cylinder body 66 of the first cylinder 60.

The charger connection portion 62 of the first cylinder 60 may be formed on the piston rod 68 of the first cylinder 60.

When the hydraulic pressure in the first cylinder 60 increases, the charger connection portion 64 can be raised to raise the charger 21, and when the hydraulic pressure in the first cylinder 60 decreases, the charger connection portion 62 may be lowered to lower the charger 21.

The second cylinder 70 may be connected to each of the base 30 and the hydraulic regulator 50. The second cylinder 70 may be rotatably connected to each of the base 30 and the hydraulic regulator 50. The second cylinder 70 may be in communication with the inner flow path of the hydraulic regulator 50. The second cylinder 70 may be a cylinder that adjusts the height of the hydraulic regulator 50.

The second cylinder 70 may comprise a base connection portion 71 rotatably connected to the base 30.

The base connection portion 71 may be rotatably supported on the second cylinder support part 32 (for example, a supporting bracket) formed on the base 30. The second cylinder 70 may be rotated to stand upward or lie down about the second cylinder support portion 32.

The second cylinder 70 may comprise a hydraulic regulator connection portion 72 rotatably connected to the hydraulic regulator 50.

A hydraulic regulator connection portion 72 may be provided opposite the base connection portion 71.

The hydraulic regulator connection portion 72 may be formed in a ring shape surrounding the outer circumference of the hydraulic regulator 50.

The base connection portion 71 may be provided on the lower side of the second cylinder 40, and the hydraulic regulator connection portion 72 may be provided on the upper side of the second cylinder 40.

The second cylinder 70 may comprise a cylinder body 76 and a piston rod 78 that operates according to hydraulic pressure inside the cylinder body 76.

The hydraulic regulator connection portion 72 of the second cylinder 70 may be formed on the cylinder body 76 of the second cylinder 70.

The base connection portion 71 of the second cylinder 70 may be formed on the piston rod 78 of the second cylinder 70.

When the hydraulic pressure in the second cylinder 70 increases, the hydraulic regulator connection portion 72 may be raised to raise the hydraulic regulator 50, and when the hydraulic pressure in the second cylinder 70 decreases, the hydraulic regulator connection portion 72 may be lowered to lower the hydraulic regulator 50.

Figure 11:
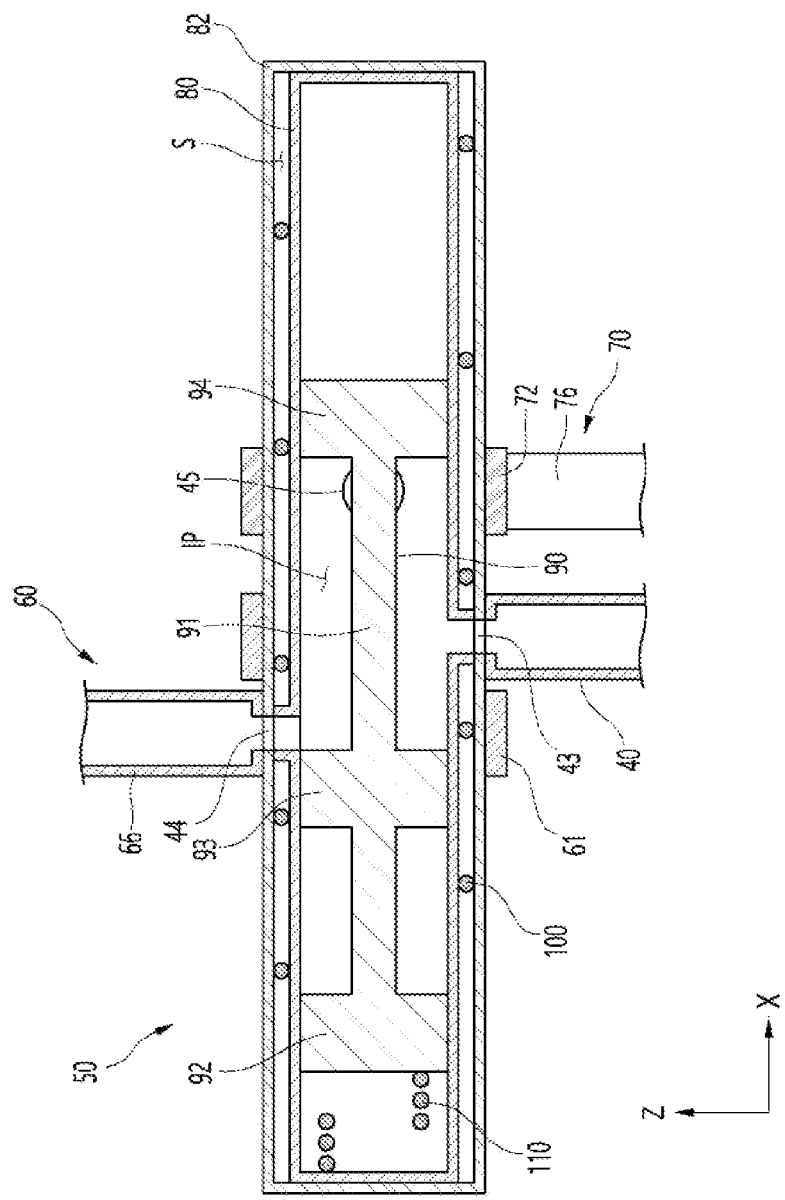

FIG. 9 is a view illustrating a hydraulic regulator according to the present embodiment, FIG. 10 is a cross-sectional view illustrating the inner flow path when the hydraulic regulator according to the present embodiment is turned off, FIG. 11 is a cross-sectional view illustrating the inner flow path when the hydraulic regulator according to the present embodiment is turned on, and FIG. 12 is a view illustrating an example in which the charger position of the charging system according to the present embodiment is variable.

The hydraulic regulator 50 can supply or block hydraulic pressure to the first cylinder 60 and the second cylinder 70. The hydraulic regulator 50 may be operated in a solenoid manner.

The hydraulic regulator 50 may comprise an inner body 80, a valve rod 90, and a coil 100.

An inner flow path IP may be formed inside the inner body 80. The inner body 80 may be formed in a cylindrical shape with both ends closed and an inner flow path IP formed therein, and the inner flow path IP may be formed therein.

The inner body 80 may be long in the left and right direction X, and the inner flow path IP may be long in the left and right direction X.

The hydraulic regulator 50 may comprise an outer body 82.

The outer body 82 may be disposed around the outer circumference of the inner body 80. The outer body 82 may be larger than the inner body 80 and may surround the inner body 80 on the outside of the inner body 80.

The outer body 82 may have an accommodation space formed therein to accommodate the inner body 80. The outer body 82 may be formed in a cylindrical shape with both ends closed and an accommodation space S formed. The outer body 82 may form the outer appearance of the hydraulic regulator 50.

The outer body 82 may cover the coil 100. The outer body 82 may surround the coil 100 on the outside of the coil 100. The outer body 82 may protect the coil 100.

The hydraulic regulator 50 may be formed with a main supply hole 43, a first supply hole 44, and a second supply hole 45.

The main supply hole 43 may be in communication with the main cylinder 40. The main supply hole 43 may be formed in the inner body 80 and the outer body 82, and the inner flow path IP may communicate with the inside of the main cylinder 43 through the main supply hole 43.

The first supply hole 44 may be in communication with the first cylinder 60. The first supply hole 44 may be formed in the inner body 80 and the outer body 82, and the inner flow path IP may be in communication with the inside of the cylinder body 66 of the first cylinder 60 through the first supply hole 44.

The first supply hole 44 may be spaced apart from the main supply hole 43. Hydraulic pressure supplied to the inner flow path IP through the main supply hole 43 may be supplied to the first cylinder 60 through the first supply hole 44.

The second supply hole 45 may be in communication with the second cylinder 70. The second supply hole 45 may be formed in the inner body 80 and the outer body 82, and the inner flow path IP may be in communication with the inside of the cylinder body 76 of the second cylinder 70 through the second supply hole 45.

The second supply hole 45 may be spaced apart from each of the main supply hole 43 and the first supply hole 44. Hydraulic pressure supplied to the inner flow path IP through the main supply hole 43 may be supplied to the second cylinder 70 through the second supply hole 45.

The valve rod 90 may be disposed to move in the longitudinal direction X of the inner body 80 along the inner flow path IP.

The valve rod 90 may comprise a rod portion 91, a first valve portion 92, and a second valve portion 93.

The rod portion 91 may be formed to be long in the longitudinal direction X of the inner body 80.

The outer diameter of the rod portion 91 may be formed to be smaller than the inner diameter of the inner body 80, and the hydraulic pressure of the inner flow path IP may be supplied through a portion between the rod portion 91 and the inner body 80.

The first valve portion 92 may protrude from the rod portion 91. The first valve portion 92 may protrude from the rod portion 91 in the radial direction. The outer diameter of the first valve portion 92 may be slightly smaller than the inner diameter of the inner body 80.

The first valve portion 92 may be formed at a position that opens and closes the first supply hole 44 when the valve rod 90 is moved. The first valve portion 92 may be formed at a position that blocks the first supply hole 44, as illustrated in FIG. 10, when the hydraulic regulator 50 is turned off. The first valve portion 92 may be formed at a position that opens the first supply hole 44 when the hydraulic regulator 50 is turned on, as illustrated in FIG. 11.

The second valve portion 93 may protrude from the rod portion 91. The second valve portion 93 may be spaced apart from the first valve portion 92 and the rod portion 91 in the longitudinal direction X. The second valve portion 93 may protrude from the rod portion 91 in the radial direction. The outer diameter of the second valve portion 93 may be slightly smaller than the inner diameter of the inner body 80.

The second valve portion 93 can open and close the second supply hole 45 when the valve rod 90 moves. The second valve portion 93 may be formed at a position that blocks the second supply hole 45 when the hydraulic regulator 50 is turned off, as illustrated in FIG. 10. The second valve portion 93 may be formed at a position that opens the second supply hole 45 when the hydraulic regulator 50 is turned on, as illustrated in FIG. 11.

The valve rod 90 may comprise a protrusion 94 protruding from the rod portion 91. The protrusion 94 may protrude from the rod portion 91 in the radial direction. The protrusion 94 may be spaced apart from the second valve portion 93 and the rod portion 91 in the longitudinal direction X. The outer diameter of the protrusion 94 may be slightly smaller than the inner diameter of the inner body 80.

The protrusion 94 may be formed at a position that opens the main supply hole 43, the first supply hole 44, and the second supply hole 45.

When current is supplied to the coil 100, a portion between the second valve portion 93 and the protrusion 94, as illustrated in FIG. 11, may be in communication with each of the main supply hole 43, the first supply hole 44, and the second supply holes 45, and the hydraulic pressure supplied between the second valve portion 93 and the protrusion 94 from the main cylinder 40 may be supplied to the first cylinder 60 and the second cylinder 70 through the first supply hole 44 and the second supply hole 45.

In the charging system as described above, current is first supplied to the coil 100, and then the main cylinder 40 can supply hydraulic pressure to the inner flow path IP.

A method for operating a charging system first supplies current to the coil 100, and thus the valve rod 90 is moved as illustrated in FIG. 11, and then the main cylinder 40 can supply hydraulic pressure to the inner flow path IP.

The coil 100 is disposed on the inner body 80 and can move the valve rod 90. The coil 100 may be accommodated between the inner body 80 and the outer body 82.

The coil 100 can move the valve rod 90 using the principle of electromagnetism.

When current is applied to the coil 100, the valve rod 90 may move along the inner body 80.

The hydraulic regulator 50 may further comprise a spring 110.

The spring 110 may be disposed on the inner body 80 and may elastically support the valve rod 100. The spring 110 may be disposed between the inner body 80 and the valve rod 100. The spring 110 may be disposed between the first valve portion 92 of the valve rod 100 and the inner surface of the inner body 80 and may be pressed against the first valve portion 92 of the valve rod 100.

The spring 110 can be compressed by the valve rod 100 when a current is applied to the coil 100, and when a current is not applied to the coil 100, the spring 110 can push the valve rod 100 by restoring force.

FIG. 12 (*a*) is a view illustrating the charger when the electric vehicle does not enter the upper portion of the charger, and FIG. 12 (*b*) is a view illustrating the charger when the electric vehicle is stopped at the reference line. FIG. 12 (*c*) is a view illustrating the charger when the electric vehicle is stopped in a position in front of the reference line, and FIG. 12 (*d*) is a view illustrating the charger when the electric vehicle is stopped in a position behind the reference line.

When the electric vehicle 1 does not enter the reference line T, as illustrated in FIG. 12 (*a*), the main cylinder 50 may not supply hydraulic pressure to the hydraulic regulator 50.

As illustrated in FIG. 12 (*b*), when the electric vehicle 1 enters the reference line T, the main cylinder 50 can supply hydraulic pressure to the hydraulic regulator 50. The hydraulic regulator 50 can distribute hydraulic pressure to the first cylinder 60 and the second cylinder 70.

At this time, the piston rod 68 of the first cylinder 60 may protrude by a first length, and the piston rod 78 of the second cylinder 70 may protrude by a second length, and the charging terminal 12 of the electric vehicle 1 stopped at the reference line T may be in contact with the contact-type charging terminal 22 of the charger 21, and the contact-type charging terminal 22 applies current to the charging terminal 12 to charge the electric vehicle 1.

When stopping, the electric vehicle 1 may be stopped at a position in front of the reference line T, as illustrated in FIG. 12 (*c*), or at a position behind the reference line T, as illustrated in FIG. 12 (*d*).

As illustrated in FIG. 12 (*c*), when the electric vehicle 1 is stopped at a position in front of the reference line T, the main cylinder 40 can supply hydraulic pressure to the hydraulic regulator 50, and the hydraulic regulator 50 can distribute hydraulic pressure to the first cylinder 60 and the second cylinder 70.

As illustrated in FIG. 12 (*c*), when the electric vehicle 1 is stopped at a position in front of the reference line T, the hydraulic pressure supplied from the hydraulic regulator 50 to the first cylinder 60 may be less than the hydraulic pressure supplied from the hydraulic regulator 50 to the second cylinder 70, and the piston rod 68 of the first cylinder 60 may protrude by a third length shorter than the first length, and the piston rod 78 of the second cylinder 70 may protrude by a fourth length longer than the second length.

As illustrated in FIG. 12 (*c*), the charger 21 is moved relatively further forward than when the electric vehicle 1 is stopped at the reference line T (see FIG. 12 (*b*)), the charger 21 can be in contact with the charging terminal 12 of the electric vehicle 1 and can reliably charge the electric vehicle 1 stopped at a position in front of the reference line T.

As illustrated in FIG. 12 (*d*), when the electric vehicle 1 is stopped at a position behind the reference line T, the main cylinder 40 can supply hydraulic pressure to the hydraulic regulator 50, and the hydraulic regulator 50 can distribute hydraulic pressure to the first cylinder 60 and the second cylinder 70.

As illustrated in FIG. 12 (*d*), when the electric vehicle 1 is stopped at a position behind the reference line T, the hydraulic pressure supplied from the hydraulic regulator 50 to the first cylinder 60 may be greater than the hydraulic pressure supplied from the hydraulic regulator 50 to the second cylinder 70, and the piston rod 68 of the first cylinder 60 may protrude by a fifth length longer than the first length, and the piston rod 78 of the second cylinder 70 may protrude by a sixth length shorter than the second length.

As illustrated in FIG. 12 (*d*), the charger 21 is moved relatively further rearward than when the electric vehicle 1 is stopped at the reference line T (see FIG. 12 (*b*)), the charger can be in contact with the charging terminal 12 of the electric vehicle 1, and can reliably charge the electric vehicle 1 stopped at a position behind the reference line T.

In other words, even if the position of the charging terminal 12 is not accurate, the charging system allows the contact-type charging terminal 22 to contact the charging terminal 12 by changing the length of the cylinder and the guide.

The above description is merely an illustrative explanation of the technical idea of the present disclosure, and various modifications and variations will be possible to those skilled in the art without departing from the essential characteristics of the present disclosure.

Accordingly, the embodiments disclosed in the present disclosure are not intended to limit the technical idea of the present disclosure, but rather to explain it, and the scope of the technical idea of the present disclosure is not limited by these embodiments.

The scope of protection of the present disclosure should be interpreted in accordance with the claims below, and all technical ideas within the equivalent scope should be construed as being comprised in the scope of rights of the present disclosure.

What is claimed is:

1. A charging system comprising a charger for charging an electric vehicle,
wherein the charger comprises:
a base;
a charger provided with a contact-type charging terminal that is in contact with or separated from a charging terminal disposed on a lower surface of the electric vehicle;
a main cylinder connected to the base and supplying hydraulic pressure;
a hydraulic regulator connected to the main cylinder and provided with an inner flow path formed therein;
a first cylinder respectively connected to the hydraulic regulator and the charger and communicating with the inner flow path; and
a second cylinder each connected to the hydraulic regulator and the base and communicating with the inner flow path.

2. The charging system of claim 1,
wherein the base is slidably disposed on a bottom of a charging station.

3. The charging system of claim 1,
wherein the charger further comprises:
a moving body on which the contact-type charging terminal is disposed, and
wherein a first cylinder connection portion to which the first cylinder is connected is formed on the moving body.

4. The charging system of claim 3,
wherein the charger further comprises:
at least one roller disposed on an outer circumference of the moving body.

5. The charging system of claim 1,
wherein the hydraulic regulator comprises:
an inner body in which the inner flow path is formed;
a valve rod disposed to move along the inner flow path in a longitudinal direction of the inner body; and
a coil disposed on the inner body and moving the valve rod.

6. The charging system of claim 5,
wherein the hydraulic regulator further comprises:
an outer body disposed around an outer circumference of the inner body and covering the coil.

7. The charging system of claim 5,
wherein the hydraulic regulator further comprises:
a spring disposed on the inner body and elastically supporting the valve rod.

8. The charging system of claim 5,
wherein the hydraulic regulator comprises:
a main supply hole through which the main cylinder communicates;
a first supply hole spaced apart from the main supply hole and communicating with the first cylinder, and
a second supply hole which is spaced apart from the main supply hole and the first supply hole and communicates with the second cylinder.

9. The charging system of claim 8,
wherein the valve rod comprises:
a rod portion long in a longitudinal direction of the inner body;
a first valve portion which protrudes from the rod portion and opens and closes the first supply hole; and
a second valve portion which protrudes from the rod portion and opens and closes the second supply hole, and
wherein the second valve portion is spaced apart from the first valve portion.

10. The charging system of claim 9,
wherein the valve rod further comprises a protrusion protruding from the rod portion, and wherein, when current is supplied to the coil, a space between the second valve portion and the protrusion communicates with each of the main supply hole, the first supply hole, and the second supply hole.

11. The charging system of claim 5,
wherein, after current is supplied to the coil, the main cylinder supplies hydraulic pressure to the inner flow path.

12. The charging system of claim 1,
wherein a guide is disposed on the lower surface of the electric vehicle to guide a movement of the charger in a horizontal direction.

13. The charging system of claim 1,
wherein a guide chamfer is formed in the guide to guide the charger.

14. The charging system of claim 1,
wherein the electric vehicle further comprises a cover that opens and closes the charging terminal.

15. The charging system of claim 14,
wherein the cover comprises:
an opening/closing cover rotated below the charging terminal;
a slide cover disposed to slide on the lower surface of a body of the electric vehicle; and
connection links connected to the opening/closing cover and the slide cover, respectively.

16. The charging system of claim 15,
wherein the electric vehicle further comprises a slide drive source that slides the slide cover forward and backward.

* * * * *